Figure 6:
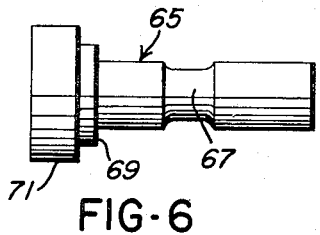

March 26, 1968  E. E. HART  3,375,312
ENCAPSULATION PROCESS
Filed Aug. 26, 1963  2 Sheets-Sheet 1
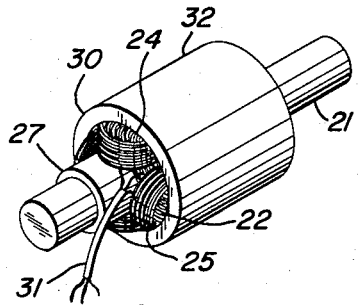
FIG-1
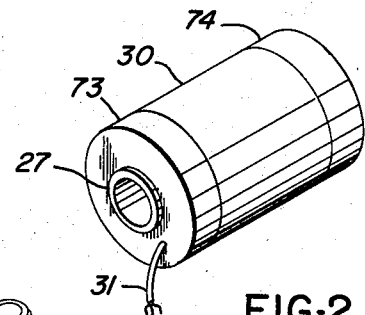
FIG-2
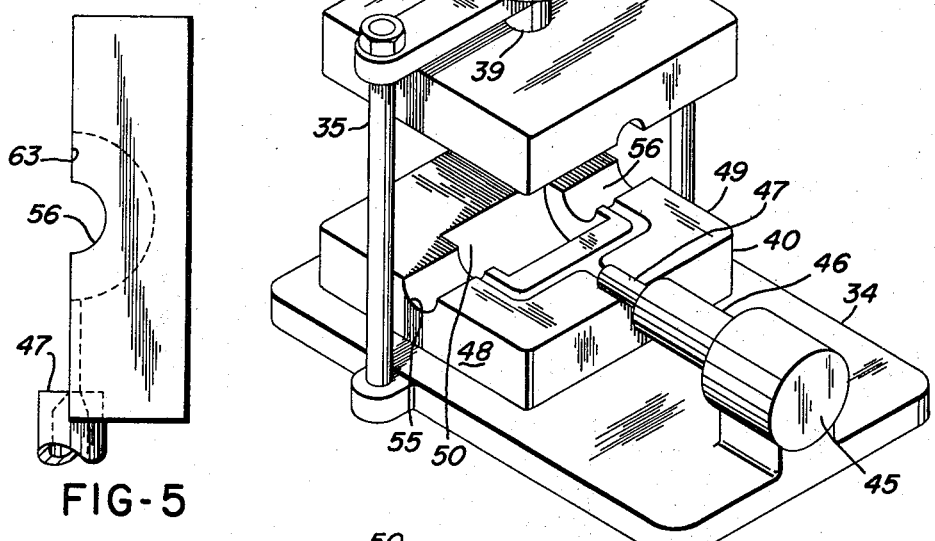
FIG-3
FIG-5
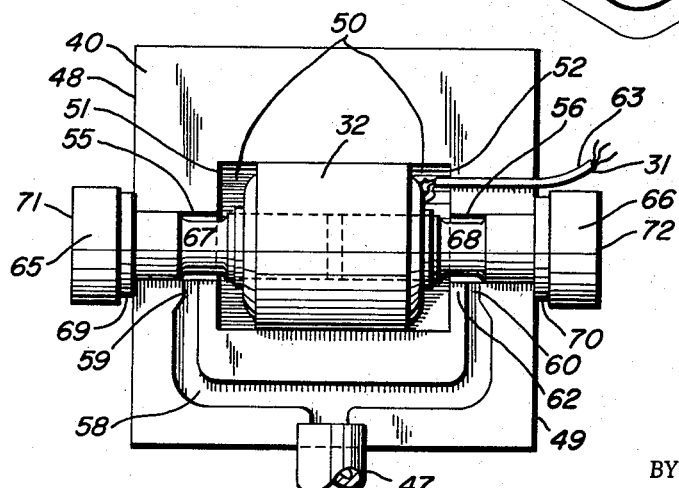
FIG-4
INVENTOR.
EDWARD E. HART
BY
ATTORNEY March 26, 1968     E. E. HART     3,375,312

ENCAPSULATION PROCESS

Filed Aug. 26, 1963     2 Sheets-Sheet 2

INVENTOR.
EDWARD E. HART

BY

ATTORNEY

United States Patent Office 3,375,312
Patented Mar. 26, 1968

3,375,312
ENCAPSULATION PROCESS
Edward E. Hart, Springfield, Ohio, assignor, by mesne assignments, to TRW Inc., Cleveland, Ohio, a corporation of Ohio
Filed Aug. 26, 1963, Ser. No. 304,500
5 Claims. (Cl. 264—272)

This invention relates to a method for molding objects from, and encapsulating objects, in plastic material; and more especially relates to a method for the manufacture of small dynamoelectric machines.

It has been a practice to construct the stators for certain fractional horse-power motors and generators by assembling on an arbor a plurality of annular core laminations each having external winding slots, disposing a winding in said external slots, forming a magnetic yoke of laminations about said core structure to completely enclose said winding, adhesively securing or bonding said laminations and windings into an integral unit, removing said arbor, and inserting a suitable rotor member journaled in precision ball bearings. In the prior art the completion of the device has been effected by the fitting of end-plates for protecting the ends of the winding and for facilitating incorporation of the completed unit into the apparatus or machine with which it is to be used. Production and fitting of the end-plates has represented a relatively complicated procedure and has added to the construction of the device an unjustifiable item of expense.

The present invention contemplates completion of the assembly of a stator as above described by a process wherein the production and fitting of end-plates is replaced by a method of encapsulation. In carrying out the invention a stator component is placed in a suitable mold, the interior of the mold and the interstices of the stator filled with a thermosetting plastic material and the whole cured into an integral unit, the sprues formed in the gating of the mold being removed by a novel means and method prior to completion of curing. The invention further contemplates means for facilitating removal of waste plastic material from a part of the molding apparatus used in carrying out the invention.

In the present state of the art it is a common procedure to inject plastic material into a mold through one or more gates, thereby forming sprues which may be cut or broken off the molded article after curing. Not only does the broken or cut sprue require a finishing step whereby burrs may be eliminated and the appearance of the surface made acceptable, but it has been found that the sprue, being by necessity of smaller section than the body of the molded article, tends to cure more quickly, setting up stresses in the adjacent material while the latter is still in an uncured condition. This tends to produce strains, cracks or porous areas in the finished product, which faults are objectionable not only on the grounds of appearance but also as providing spots where moisture or oil may find its way into the interior of the molding.

The present invention is primarily directed to means and method for encapsulating an electromagnetic structure, for example the stator of a small alternating-current motor or generator, by injecting plastic material into a mold enclosing said structure, shearing the sprues while still in an uncured state and maintaining said mold closed until curing of the product is complete, with the result that there may be obtained a stator of equivalent performance but of much lower cost than that customarily obtained.

Figure 7:
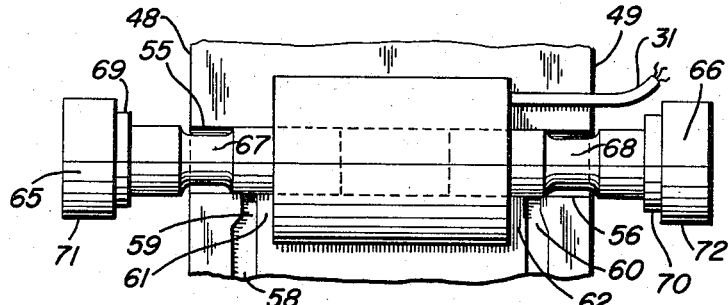
Figure 8:
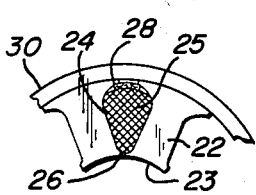
Figure 9:
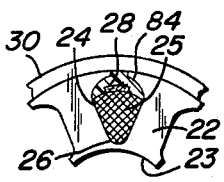
Figure 10:
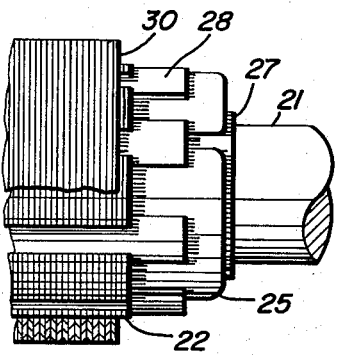
Figure 11:
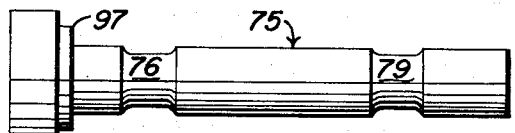
Figures 14, 15:
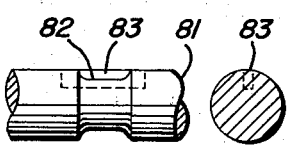
Figure 16:
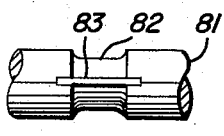

The present invention will be further understood by a reading of the description following hereinafter, made with reference to the drawings, in which:

FIGURE 1 is a perspective view of a motor stator, assembled, wound, and ready for encapsulation according to the principles of the invention, FIGURE 2 is a perspective view of a similar stator after encapsulation, FIGURE 3 is a perspective view of a molding press adapted for carrying out encapsulation according to the invention, FIGURES 4 and 5 are plan and end elevations respectively, of portions of a molding press adapted to the purposes of the invention, FIGURE 6 is a side elevation of an element of the molding press shown in FIGURE 5, FIGURE 7 is a partial plan view of the molding press shown in FIGURES 4 and 5, with certain of its operating elements displaced from the positions indicated in FIGURE 4, FIGURES 8 and 9 are sectional views on an enlarged scale of elements of a completed stator assembly respectively before and after application of the process to which the invention is directed, FIGURE 10 is a side elevation, partly in section, of a portion of a stator before molding according to the process of the invention, FIGURE 11 is a side elevation of a modified molding press element usable alternatively to the means shown in FIGURES 4, 6 and 7, FIGURES 12 and 13 are views showing consecutive steps in a process alternative to that shown in FIGURES 4 and 7, with corresponding components in two operating positions, and FIGURES 14, 15 and 16 are, respectively, top, side, and end elevations, partly in section, of a further alternative form of a component of the molding press apparatus of the invention.

FIGURE 1 represents an assembled alternating-current motor stator adapted to application of the process of the invention. One manner of assembly of the AC stator is as follows. Upon cylindrical arbor 21 are stacked a plurality of laminated iron plates 22 (see FIGURE 10) circular in form and provided with a central opening 23 (see FIGURES 8 or 9) through which the arbor 21 closely fits. The laminations further have the openings 24, which upon assembly combine to form axially disposed slots adapted to receive a winding 25 of insulated wire. The disposal of the openings 24 in each plate is such that, while a thin fin 26 separates the slot opening 24 from the central opening, or "tunnel" 23, the outer portion of the opening 24 intersects the periphery of the plate, so that when the plates are stacked on the arbor there is formed a laminated core with outwardly directed slots substantially identical to the core structure of a direct-current armature. The stack of laminations may be provided at each extremity with a spider or tubular member 27 having a central opening of the same diameter as the central opening 23 in the lamination, fitting the arbor 21 and assisting to retain the laminations 22 in place until more permanently secured. The spider member 27 further serves as a bearing housing for rotor bearings upon assembly of the complete AC motor.

The assembled core structure is then coated, or impregnated, with a suitable insulating binder or cement or with an epoxy resin, according to any of the many known processes, which per se form no part of the present invention. One such process is known as "corveling." The core structure, with the arbor still in place, is then mounted in a conventional armature winding machine and provided with the winding 25 of insulated wire of a size and arrangement suited to the type of machine under construction and secured in the slots by means of fiber wedges 28. Completion of the magnetic circuit of the AC stator is effected by surrounding the core structure as above described with a stack of annular discs 30, tightly fitting the peripheral surfaces of the plates 22 and providing with the same a compact cylindrical magnetic structure 32 having the windings in totally enclosed slots, as shown in FIGURES 1 and 10.

The conductors terminating the several sections of the winding 25 are suitably interconnected, according to the type of machine under construction, and the several leads, mutually insulated are brought away from the winding through a section of insulating tube 31. The completed assembly is subjected to coating or impregnation with a suitable insulating and sealing compound, as by some one of the epoxy resins commercially available, which, after setting, drying, or curing, provides an integral unitary structure 32, from which the arbor 21 may be removed. Here again the "corvel" process may advantageously be employed.

FIGURE 3 represents one form of hydraulic press suited to carrying out the process to which the invention is directed. A horizontal base-plate 34 carries two vertically disposed pillars 35 and 36 joined by a bridge member 37, which in turn carries a vertically disposed hydraulic cylinder 38 having a downwardly directed piston 39. Positioned upon the base-plate 34, beneath the piston 39 is a lower mold element 40 (shown in more detail in FIGURES 4, 5, 12 and 13, and presently to be more fully described). Carried by the piston 39 is an upper mold element 41 adapted for cooperation with the lower mold element 40. Operative engagement of the mold elements 40 and 41 is effected by the piston 39 which may raised or lowered by fluid pressure.

Laterally mounted upon the base-plate 34 is a second hydraulic cylinder 45 having an attached chamber 46 adapted to contain a measured portion, or "slug" of suitable plastic injection material, and terminating in a nozzle portion 47 which communicates with the inner portion of the lower mold element 40. The cylinder 45 is provided with a piston and fluid-pressure connections (not shown), whereby plastic material placed in the chamber 46 may be injected into the mold assembly through the nozzle 47.

The lower element 40 of the mold, shown in FIGURES 4 and 5, has formed therein a semi-cylindrical cavity 50 of a configuration corresponding to that of the complete magnetic structure to be produced. The axial length of the cavity 50 is slightly longer than that of the stator strucure 32. The cavity 50 is further formed by the semi-annular faces 51 and 52, leading to two aligned semi-bores 55 and 56 extending between the faces 48 and 49 of the mold element 40 and the faces 51 and 52.

Formed in the flat upper face of the lower mold element 40 is a bifurcated channel or runner 58 having its branches laterally communicating with the respective bore sections 55 and 56 through constricted portions or "gates" 59 and 60, separated from the respective cavity faces 51–52 by "partitions" 61 and 62. The "stem" of the bifurcated channel 58 communicates directly with the nozzles portion 47 of the chamber 46. Conveniently located in the mold face is a small channel or groove 63 of semicircular section, providing communication between the exterior and the interior of cavity 50, wherein may be positioned the insulating tubing 31 enclosing the leads to the winding 25.

The upper element 41 of the mold is substantially symmetrical to the lower element 40 and is adapted to mate with the same; however, the channel 58 and the gate sections 59 and 60 may be omitted. Preferably, there is provided a semicircular groove (not shown) in the lower face of the mold element 41 adapted to mate with the groove 63 in the element 40 to provide a cylindrical channel to accommodate the insulating tubing 31. When fluid pressure is suitably applied within the hydraulic cylinder 38 the said mold elements 40 and 41 are forced into cocoperative engagement, the cavity portions within them cooperating to form a single cavity to accept a stator for encapsulation. The upper mold member 41 serves to seal the channel 58 into a bifurcated closed duct and also to provide sealing relationship between it and the nozzle portion 47.

The mold elements 40 and 41 are provided with suitable built-in heating means such as electrical coils (not shown) to maintain their temperature at a predetermined value so that the plastic material will flow freely into the mold.

In order to position the assembly 32 in the mold, and for excluding plastic material from its interior bore, there are provided two similar plugs, or mandrels 65 (see FIGURE 6) and 66 having their principal diameter substantially identical with the bore of the stator assembly 32 and adapted to be positioned therein after removal of the assembling and winding arbor 21. The mandrels 65 and 66 having sections 67 and 68, respectively, of reduced diameter forming circumferential grooves, and of such axial length as to provide communication from the gates 59–60, past the partitions 61–62 respectively into the respective extremities of the central portion of the mold cavity 50. Under hydrostatic pressure plastic material may therefor flow into said cavity in a generally radial sense outward from the bore. Longitudinal positioning of the mandrels 65 and 66 is determined by shoulders or collars 69 and 70 respectively, integral therewith and adapted to engage the outer surfaces 48 and 49 of the mold elements when the mandrels are inserted to a position where the sections 67 and 68 provide communication between the channels as described. The mandrels 65 and 66 are formed with head portions 71 and 72 respectively, providing for grasping or prying the mandrels when withdrawing the same from the mold. It is apparent that other means may be provided for accomplishing the positioning of the mandrels, and such may be done automatically if desired. With the upper element 41 being withdrawn to its topmost position as indicated in FIGURE 3, the stator assembly 32 to be processed is placed in the cavity 50 of the lower mold element 40; the mandrels 65 and 66 are inserted one in each end of the bore of the structure and longitudinally positioned as indicated in FIGURE 4, so that, the stator assembly 32 is symmetrically located with respect to the ends of the mold cavity 50, and the sections 67 and 68 are so positioned as to provide communication from the gates 59 and 60 and the respective spaces between the extremities of the assembly 32 and the annular flat faces 51 and 52 of the mold cavity. The insulating tubing 31, enclosing the conductors to the winding, is placed in the small groove 63. The mold is then closed by suitable application of fluid pressure in the cylinder 38, and the two elements 40 and 41 brought into interlocking and sealing relationship, with the insulating tubing 31 being tightly gripped between the groove 63 and the mating groove in the mold element 41.

A measured portion (or "slug") of suitable plastic molding material is placed in the chamber 46, which, like the mold elements 40 and 41 is maintained at a suitable high temperature by heating means (not shown). While a wide variety of molding materials is available, satisfaction has been obtained by the use of a thermo-setting resin known by the trade name of "Glaskyd," produced by the Glaskyd Company of Perrysburg, Ohio, and comprising an alkyd resin containing finely divided particles of glass in a fibrous form. This material flows freely, and subsequently "cures" (polymerizes) at a temperature of the order of 300° F. Fluid pressure being suitably applied to the cylinder 45, the material in the chamber 46 is forcibly injected through the nozzle portion 47 into the mold, passing through the runners 58, the gates 59 and 60, around the sections 67 and 68 of the mandrels 65 and 66, around the ends of the partitions 61 and 62 and into the open spaces of the mold cavity 50.

It has been found that under proper conditions, the plastic material will not only fill the space between the inner surfaces of the mold and the outer surfaces of the stator but that it will be forced into the slots, surrounding and embedding the conductors therein, tending to compress the winding to a smaller over-all cross-section, and completely filling all space and interstices not already occupied by the conductors or the original insulation coating. This condition is illustrated in FIGURES 8 and 9, the former showing in section, the general distribution of the wires before, and the latter, after, encapsulation. It will be observed that in FIGURE 9 the winding has been laterally compressed and that all interstices and former air spaces are filled with plastic. This material, when cured, having a high tensile strength, provides the equivalent of a group of tension members, greatly enhancing the ability of the structure to resist disruptive longitudinal stresses. It is further seen that the masses of plastic material formed at the extremities of the stator assembly 32 are effectively joined and structurally supported by the longitudinally extending plastic channels 84. Within a short time after injection of the plastic material into the mold, and before polymerization is complete, the mandrels 65 and 66 are partially withdrawn from their original positions (see FIGURE 4) in the mold to the positions indicated in FIGURE 7. This, it will be seen, involves axial displacement of the mandrels 65 and 66 to positions where there is no longer communication between the gates and the interior of the mold, the latter remaining sealed by the "piston-valve" action of the normal-section portions of the mandrels completely filling the bores in which they are positioned. The forcible axial displacement of the mandrels causes a shearing action to take place between the inner rims of the plastic material surrounding reduced sections 67 and 68, and the openings in the mold faces 51 and 52 respectively, effectively shearing off the sprues before their material is completely cured, and at the same time maintaining enclosure of the mold until curing has been completed.

After the lapse of a suitable time for complete curing, the press is released by action of the cylinder 38, separating the mold elements 40 and 41. The mandrels 65 and 66 may be removed from the encapsulated stator structure either before or after the latter is lifted from the mold. The finished stator structure is in the form shown in FIGURE 2, having the laminated rings 30 forming a central cylindrical portion and the ends formed by cylindrical caps 73 and 74 of plastic material solidly embracing the rings and made mutually integral by the polymerized plastic material which occupies all former air spaces and interstices in the magnetic structure.

Figure 12:
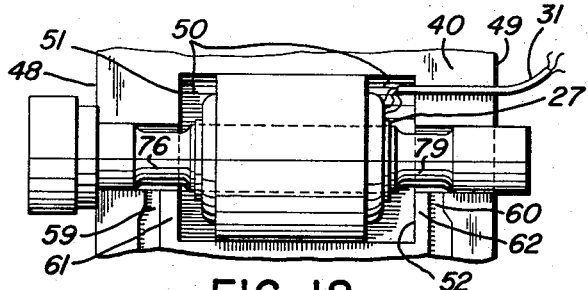
Figure 13:
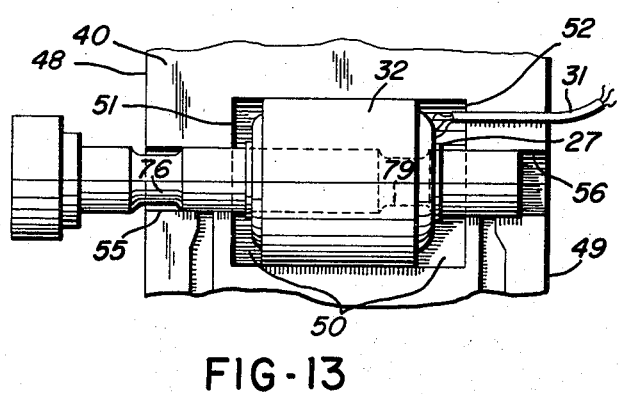

As an alternative to the use of the two mandrels 65 and 66, their functions may be combined in a single unit, as indicated in FIGURES 11–13. FIGURE 11 shows a mandrel 75, and FIGURES 12 and 13 its two operating positions with respect to the mold element 40. The mandrel 75, at its left hand end as seen in the drawings, is identical with either of the mandrels 65–66, having an annular reduced portion 76, a shoulder or collar 77 and a gripping or prying head 78, identical in their relative disposition with the corresponding respective elements 67, 69 and 71 of the mandrel 65. The over-all length of the mandrel 75 is made such that its right-hand extremity will project through the corresponding side of the mold; and that end is formed with a reduced annular section 79 so spaced axially with respect to the section 76 that when the mandrel 75 is placed in the mold 40 at its extreme right-hand position as determined by engagement of the collar 77 with the left-hand edge 48 of the mold element, as indicated in FIGURE 12, the section 79 will be in a position to provide communication between the gate 60 and the right-hand end of the mold cavity. In so far as flow channels are concerned, this arrangement corresponds with that shown in FIGURE 4, the material entering through the gates 59 and 60 will fill the cavity and the interstices in the contained unit in the same manner as in the previously described embodiment.

Upon completion of the filling of the mold, and after partial curing of the contained plastic, the mandrel 75 is bodily moved toward the left as seen in FIGURE 13, until it attains a position wherein the sprue in the gate 59 has been severed by the right-hand edge of the section 76 in coaction with the inner edge of the flat end 51 of the mold cavity. At the same time, the groove 79 will have entered the bore or tunnel of the stator and in its engagement with the tubular member 27 of the latter will have effected a similar shearing action, while the normal diameter portions of the mandrel will effectively seal the passages 55 and 56, maintaining the mold cavity closed. Upon completion of curing, as in the previously described embodiment, the mandrel 75 may be removed from the encapsulated structure either before or after the latter is lifted from the mold.

In the practice of the invention as hereinabove described, it has been found that with some specific compositions of the plastic material, or with certain curing cycles, there is a tendency for the material filling the annular grooves 67, 68, etc. in the mandrels to be cured in that location forming a solid ring encircling the reduced section. Removal of this ring in preparation for the succeeding cycle may introduce certain difficulty and delay before the mandrel can be used again. FIGURES 14, 15 and 16 are views of a modification in a mandrel 81, whereby this feature, if objectionable, may be eliminated. The mandrel 81 is similar to any one of the mandrels 65, 66 or 77 hereinbefore described, and has a section of reduced diameter 82, similar to that in any one of the previous described mandrels. A portion of the mandrel extending axially a short distance on either side of the groove is slotted to a depth somewhat greater than that of the groove; and in this slot is secured a thin metallic bar 83, serving to interrupt the circumferential continuity of the annular groove and form a partition, whereby, when the mandrel 81 is used in any of the molds, the plastic material flowing from the gate to the interior of the mold will not form a continuous ring about the mandrel, but will have a gap, so that when the mandrel is removed from the mold the ring of waste material may readily be broken out and the mandrel cleared for the next operation.

Although various specific arrangements of elements enabling the practice of the process of the invention have been described, it is to be readily understood that many changes may be made in structure of elements or arrangement of parts to accomplish the same result and still remain within the spirit and scope of the invention as defined in the appended claims.

What I claim is:

1. In a method for the manufacture of a stator for electric motors, the steps comprising:
   assembling a stack of annular core laminations presenting upon assembly a plurality of winding slots,
   disposing a stator winding in said slots,
   assembling a stack of laminations about said core laminations to form a magnetic yoke thereabout,
   placing said assembly into the cavity of a mold,
   injecting a thermoplastic material into the center of the mold and flowing same radially outwardly about the ends of said multi-stacked assembly and into the interstices thereof,
   then during the course of the polymerization of said material shearing said sprues formed within said mold, and thereafter retaining said article within the mold until fully cured, whereby no finishing steps are required to remove burrs and no stresses are set up in the molded material adjacent the sprues.

2. A method of encapsulating an annular stator containing inserted windings and having a central bore therein, comprising:
   enclosing said stator in a mold having an internal cavity and at least one channel leading therefrom to a supply of thermoplastic material,
   positioning a longitudinally displaceable mandrel within said bore, said mandrel having a circumferential groove so disposed as to be at least in partial communication with said channel, injecting a mass of thermoplastic material through said channel and groove and into said cavity.

prior to complete curing of said material repositioning said mandrel so that an edge of said groove serves to sever the sprue formed within said channel, maintaining said mandrel in said new position until curing is complete, and thereafter withdrawing said mandrel from the bore of said stator.

3. A method of encapsulating an annular stator containing inserted windings and having a central bore there-comprising:

enclosing said stator in a mold having an internal cavity and a pair of channels leading from opposite ends of said cavity to a supply of thermoplastic material, positioning a pair of longitudinally displaceable mandrels within said bore, said mandrels each having a circumferential groove so disposed as to be at least in partial communication with one of said channels, injecting a mass of thermoplastic material through said channels and grooves and into said cavity, repositioning said mandrels prior to complete curing of said material so that an edge of each groove serves to sever the sprue formed within its respective communicating channel, maintaining said mandrels in said new positions until curing is complete, and thereafter withdrawing said mandrels from the bore of said stator.

4. A method of encapsulating an annular stator containing inserted windings and having a central bore therein, comprising:

enclosing said stator in a mold having an internal cavity and a pair of channels leading from opposite ends of said cavity to a supply of thermoplastic material, positioning a longitudinally displaceable mandrel within said bore, said mandrel having a pair of spaced apart circumferential grooves so arranged that each groove is at least in partial communication with one of said channels, injecting a mass of thermoplastic material through said channels and grooves and into said cavity, axially repositioning said mandrel prior to complete curing of said material so that an edge of each groove serves to sever the sprue formed within its respective communicating channel, maintaining said mandrel in said new position until curing is complete, and thereafter withdrawing said mandrel from the bore of said stator.

5. A method of encapsulating an annular stator containing inserted windings and having a central bore therein, comprising:

enclosing said stator in a mold having an internal cavity and at least one channel leading therefrom to a supply of thermoplastic material, positioning a longitudinally displaceable mandrel within said bore, said mandrel having a circumferential groove so disposed as to be at least in partial communication with said channel, said groove being discontinuous whereby to prevent the formation of a closed ring of thermoplastic material upon subsequent molding, injecting a mass of thermoplastic material through said channels and grooves and into said cavity, prior to complete curing of said material repositioning said mandrel so that an edge of said groove serves to sever the sprue formed within said channel, maintaining said mandrel in said new position until curing is complete, and thereafter withdrawing said mandrel from the bore of said stator.

References Cited

UNITED STATES PATENTS

| 3,002,261 | 10/1961 | Avila | 29—155.5 |
| 3,084,418 | 4/1963 | Procopio | 29—155.5 |
| 3,194,993 | 6/1965 | Hackney | 310—43 |
| 3,196,297 | 6/1965 | Keading | 310—43 |
| 1,888,613 | 2/1930 | Apple | 264—272 X |
| 2,637,073 | 5/1950 | Walther | 264—161 X |
| 2,983,958 | 5/1961 | Fay | 264—161 |

ROBERT F. WHITE, *Primary Examiner.*

ORIS L. RADER, *Examiner.*

J. W. GIBBS, S. I. LANDSMAN, J. A. FINLAYSON, *Assistant Examiners.*